Dec. 8, 1936.    B. JOHNSEN    2,063,100
GRID USED IN CONNECTION WITH ICE TRAYS
Original Filed Dec. 12, 1931    2 Sheets-Sheet 1
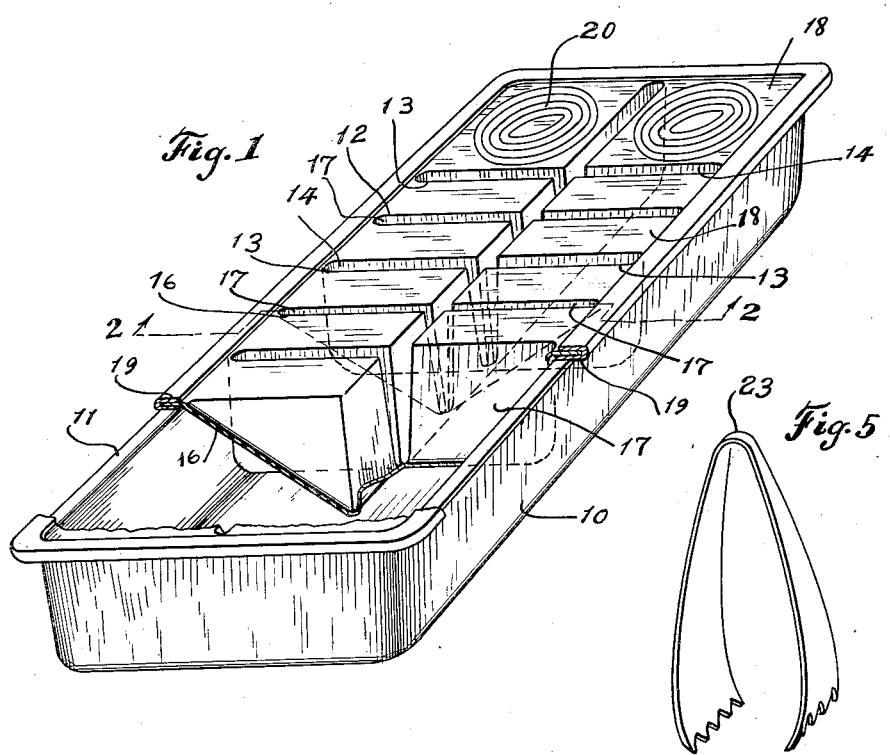
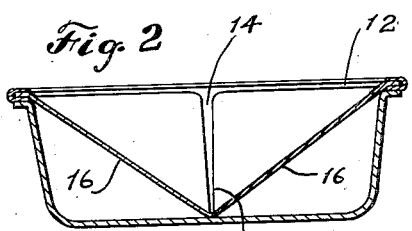
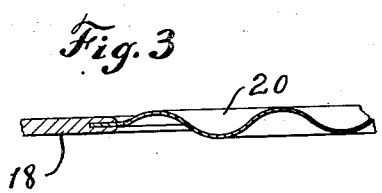
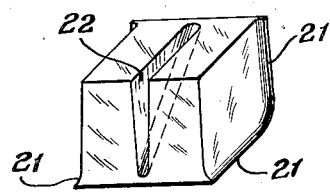
INVENTOR
Birger Johnsen
BY   ATTORNEY Dec. 8, 1936. B. JOHNSEN 2,063,100
GRID USED IN CONNECTION WITH ICE TRAYS
Original Filed Dec. 12, 1931    2 Sheets-Sheet 2
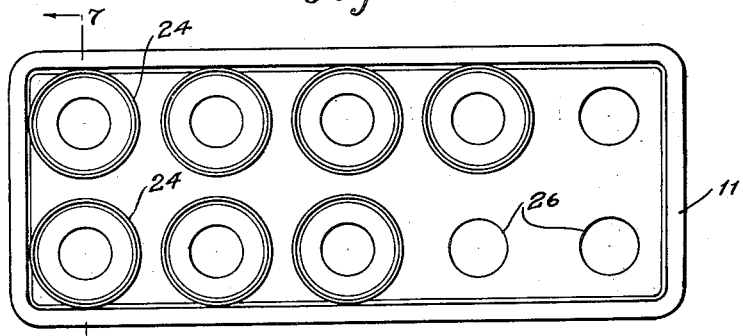
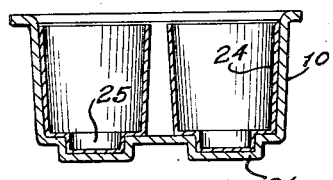
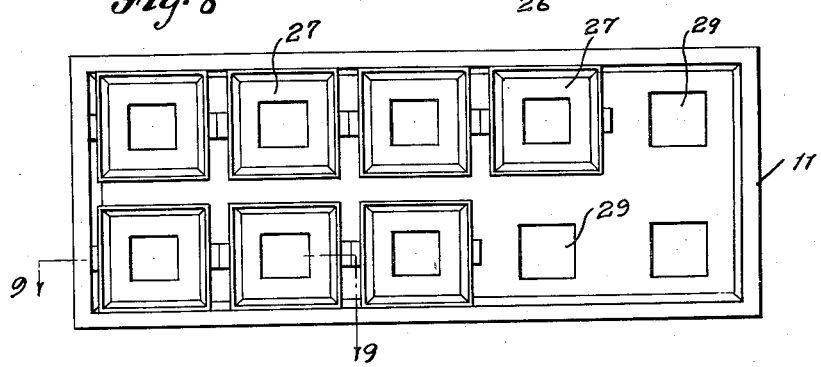
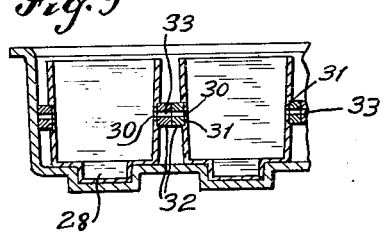
INVENTOR
*Birger Johnsen*
BY  ATTORNEY Patented Dec. 8, 1936

2,063,100

UNITED STATES PATENT OFFICE 2,063,100

GRID USED IN CONNECTION WITH ICE TRAYS

Birger Johnsen, Brooklyn, N. Y.

Refiled for abandoned application Serial No. 580,626, December 12, 1931. This application September 22, 1936, Serial No. 102,049

4 Claims. (Cl. 62—108.5)

This application is for patent for an invention, for which application was first filed December 12, 1931, under Serial No. 580,626, and which application was allowed August 28, 1934, and subsequently forfeited for non-payment of the final fee.

The said invention relates to new and useful improvements in domestic mechanical or gas refrigerators, and more specifically to the so-called grids or dividers used in connection with ice pans or trays for the production of household or service ice-cubes.

While various attempts have been made to provide means for making ice-blocks, or cubes, of a predetermined shape, the results attained have generally been unsatisfactory in several respects. Thus difficulties have been experienced in extricating the said ice-cubes from the grid, or vice versa; or, at least, in extricating these quickly without melting a substantial portion of the ice; and furthermore means has hitherto been lacking for obtaining a quick and efficient production of the said ice-cubes.

It is a well known fact, that rubber implements have been used in the said production, but the results obtained this way have been far from satisfactory, mainly on account of the obnoxious taste conveyed to the said ice by the rubber, and also because it takes at least a third part of the time longer to freeze in a rubber tray than with ordinary solid grids.

It is these major obstacles, and several others, which this invention has for its purpose to eliminate in a simple and yet ingenious manner.

In this present instance the grid has been formed with crosswise arranged partitions, which are hollow and open in an upward direction. This arrangement serves a double purpose; first, it facilitates the speedy and efficient freezing of the water into ice-cubes, as it permits the latent heat to escape much quicker through the upwardly opening slots, and also the greatly increased area of water to be exposed to the surrounding chilled atmosphere, as the latter naturally will have a tendency to reach and settle at the lowest portion or bottom of the recessed slots or openings in the grids; and secondly, it offers an extremely easy means of extricating the ice-cubes by applying a medium capable of radiating heat, or by pouring lukewarm or hot water into the said hollow cavities of the partitions, thus obtaining an almost instantaneous disengagement of the grid from the said ice-cubes without any loss or diminution of the volumes of the said cubes of ice, which otherwise usually is the case, when hot water is poured over the commonly known grid with its cubes of ice frozen on thereto.

Another important advantage of my invention resides in the fact that the said grid is integrally connected to a cover, which is formed with openings corresponding in extent to those of the partitions of the said grid, and as the said cover is provided with means for securing a snug fitting thereof to the ice pan or tray, the latter may, when filled with water, freely be moved from one place to another without fear of spilling the said water.

Another advantageous feature to be especially noted is, that this device may, on account of its specific arrangement of the cover, be submerged into hot water without in any way exposing the ice-cubes to contact with the latter, thereby causing the instantaneous extrication of the said ice-cubes from as well the grid as the bottom and sides of the tray, leaving the ice-cubes disposed in a nice array upon, or within, the said tray.

Another important feature, incidental to the use of this snugly fitting, covered type of a grid-system, is, that the ice, which is very susceptible to odors at the time of freezing, will not be affected in this instance by such odors, should they happen to be present in the refrigerator. This is a condition against which no precaution has been taken in the grid-systems now commonly used.

Still another important advantage of this present construction resides in the fact, that the lower portion, especially, of the frozen ice-cube, made with, what may appropriately be termed the "Birger" grid, has been formed with a lip or skirt laterally extending between each ice-cube. This arrangement prevents the cubes from freezing or sticking together again, when the grid is removed, and if the tray is slightly tilted and the cubes allowed to slide together into contact with each other. This is also a condition not guarded against in the now commonly used straight walled, solid grids.

It will be obvious that the invention, as herein described, may be made of any suitable material.

With the above and other objects in view, this invention consists of the novel features of construction, combination and arrangement of parts, hereinafter fully described, claimed and illustrated in the accompanying drawings forming part of this specification, and in which similar characters of reference indicate corresponding parts in all views, and in which:—

Figure 1 is a perspective top plan view of my invention; Figure 2 is a transverse sectional view taken on the line 2—2 of Figure 1; while Figure 3 represents a detail illustration of my device; Figure 4 illustrates an ice-cube made by using my grid-system; Figure 5 shows a pair of ice-tongs; Figure 6 shows a slight variation from my device, but with the principles of the latter, however, embodied therein; Figure 7 is a detail view referring to Figure 6; while Figures 8 and 9 show still another modification of my device, as disclosed in Figure 6.

Referring more particularly to the drawings, 10 indicates a tray, or ice pan, formed preferably with somewhat inwardly sloping sides and rounded bottom corners, and with an upper flatly bent edge-portion 11.

A grid 12 made to fit within the said tray, and any tray in general, comprises a plurality of crosswise arranged double-walled partitions 13, which in turn form dividing compartments for the separation of ice into cubes.

The said grid may be formed by a casting or stamping process, or by bending sheets of metal upon themselves, thereby forming both the partitions proper, and also the intervals or recesses 14 between the latter, respectively.

In this connection it may be noted that the said recesses are tapered in a downward direction, as shown in one instance at 15 in Figure 2.

In about the center between two partitions 13, 13, is arranged a semi-double-walled partition 16, constructed substantially as the other partitions, that is with a recess 17 therein, but the said semi-partition-wall extends only about half-way down into the compartments formed by the two regular sized partition walls 13, 13.

While thus the said semi-partition-wall forms a slit only, in the ice-cubes made, the purpose and effect of the partition-walls generally is greatly enhanced by adding such semi-double-walled partitions to the constructional arrangement, as will be obvious in view of the introductory statement setting forth the intents and purposes of this device.

A cover 18 is integrally attached to the top-portion of the grid, in any suitable manner as by soldering, casting or stamping, with openings, corresponding to those in the partition-walls of the grid, being formed in the said cover. Around and upon the edges of the said cover is mounted a rubber member 19 in order that the grid with its cover may form a compact watertight unit with the ice tray.

The cover has at each corner been arranged with a small substantially circular corrugated, flexible portion 20, for the purpose of having available indicating means that will show when the water in the tray has been frozen into ice, as in this instance the frozen water with its large coefficient of expansion will form a slightly upwardly bulging portion upon the cover at the said corners. It is obvious that such indicating means may be arranged anywhere upon the said cover.

The ice-cube proper is, as has been clearly shown in Figure 4, formed with a skirt or lip 21 for the purpose formerly stated. The said ice-cubes, or the majority of the latter, are further formed with a semi-transverse slit 22, which will permit the breaking of such ice-cubes into half their sizes, when desired, such breakage may easily be accomplished by inserting the handle 23 of a pair of tongs, shown in Figure 5, into said slit 22, and twisting the handle gently.

It is evident that the ice-cubes, as arranged upon the tray according to this invention, may easily be picked up by means of a pair of ice-tongs, as shown in Figure 5, thereby eliminating the necessity of touching the ice-cubes with the hands.

A modification of my device is shown in Figure 6, where a number of individual cups 24, which may be of any desired shape, but shown herein as round, are arranged upon a tray with ample space among the said cups.

These cups are formed with a narrowed bottom portion 25 adapted to register with a corresponding recess 26 in the said tray. In this case the said cups, or any individual of these, may be filled with water to be frozen into ice-cubes.

In like manner any individual cup, or number of cups, may be removed without disturbing the balance within the tray or upsetting the rest of the cubes.

A further modification is shown in Figure 8, where the cups 27 are of a square form, tapered towards their bottom, the latter terminating in an offset portion 28, adapted to register with a corresponding recess 29 in the tray, as formerly described in connection with the disclosure in Figure 6.

While the said cups also in this modified view are arranged in spaced relation to each other, provision has been made to fill them all, or each row, at the same time. This is accomplished by forming each cup with openings 30 oppositely arranged, and by having said openings upon the outer side of each cup surrounded with a shallow recess 31, into which a rubber member 32, formed with a central bore 33, is inserted and securely attached in any suitable manner.

When the said cups are thus arranged in a predetermined position by means of the recesses in the bottom of the tray, the said rubber members between the cups will meet and press closely together and their openings register, thereby allowing a free flow of water from one cup to another, when the filling is done.

The relative arrangement of the said cups and tray is normally to the effect, that the rubber member of the last cup near the end-wall of the tray presses up against the latter, thereby preventing any spilling of water from the cups.

It is evident that changes may be made in the form, construction and arrangement of the several parts, as shown, within the scope of the appended claims, without departing from the spirit of the invention, and I do not therefore desire to limit myself to the exact construction and arrangement shown and described herein.

What I claim as new and desire to secure by Letters Patent of the United States, is:—

1. In a device of the class described, an ice tray, a grid comprising a plurality of crosswise arranged partitions, semi-partitions transversely disposed between the latter, a cover integral with the said grid, downwardly tapered recesses extending from above through the said cover and into the said partitions and semi-partitions, and a rubber packing mounted upon the edges of the said cover to secure a compact fitting of the latter with the said tray.

2. In a device of the class described an ice tray, a grid comprising a plurality of crosswise arranged partitions, semi-partitions laterally extending between the said former partitions, a cover integral with the said grid and formed with somewhat thinner, substantially circular-shaped corner-portions, downwardly tapered recesses extending from above through the said cover and into the said partitions and semi-partitions, and a rubber packing mounted upon the edges of the said cover to secure a compact fitting of the latter with the tray.

3. In a device of the class described, an ice tray, a grid comprising a plurality of crosswise arranged full sized partitions, semi-partitions transversely disposed between the latter, a cover integral with the said grid, downwardly tapered recesses extending from above through the said cover and into the said full sized partitions and semi-partitions, the full sized partitions being formed with somewhat rounded corners, whereby to impart to the ice-cube a skirt, and a rubber packing mounted upon the edges of the cover to secure a compact fitting of the latter with the said tray, substantially as and for the purpose set forth.

4. In a device of the class described, an ice tray, a grid comprising a plurality of crosswise arranged full-side partitions, semi-partitions laterally extending between the said former partitions, a cover integral with the said grid and formed with somewhat flexible, substantially circular-shaped corner-portions, downwardly tapered recesses extending from above through the said cover and into the said full-side partitions and semi-partitions, the full-side partitions being formed with somewhat rounded corners, whereby to impart to the ice-cube a lip, and a rubber packing mounted upon the edges of the cover to secure a compact fitting of the latter with the said tray, substantially as and for the purpose set forth.

BIRGER JOHNSEN.